United States Patent Office 3,345,351
Patented Oct. 3, 1967

3,345,351
PROCESS FOR PRODUCING REDUCED
TRANSITION METAL HALIDES
Marvin A. McCall and Newton H. Shearer, Jr., Kingsport, Tenn., assignors to Eastman Kodak Company, Rochester, N.Y., a corporation of New Jersey
No Drawing. Filed June 20, 1963, Ser. No. 289,413
12 Claims. (Cl. 260—93.7)

This invention relates to a novel process for the production of reduced transition metal halides and to the product thus produced. In a specific aspect this invention relates to an improved process for the polymerization of olefins to solid, crystalline polymers with a catalyst containing novel reduced transition metal halides. In another specific aspect this invention relates to the polymerization of propylene and higher molecular weight olefinic hydrocarbons in the presence of a catalyst containing an improved reduced transition metal halide.

Solid, high molecular weight, crystalline polymers have been formed from propylene and higher molecular weight olefins using catalyst systems containing a reduced transition metal halide as one of the catalyst components. The reduced transition metal halide is an essential component of the catalyst and various methods have been employed to produce the reduced transition metal halides. One of the methods has involved the reduction of the transition metal halide from its maximum valence with hydrogen. The resulting product is a reduced transition metal halide, but when this halide is employed in the polymerization of propylene and similar olefins to solid, crystalline polymer, the reaction rates are rather low and uneconomical, and the polymeric product contains substantial amounts of atactic or amorphous polymer. Attempts to improve the polymerization rate in order to achieve an economical process have resulted primarily in increased production of the atactic or amorphous polymer without achieving the desired increase in the production of highly crystalline polymer.

Another method for producing reduced transition metal halides involves the reduction of a transition metal halide from its maximum valence with aluminum or other similar reducing metal. In this reaction the halide of the reducing metal is one of the products and the difficulties encountered in this process can be illustrated using aluminum as the reducing metal and titanium tetrachloride as the transition metal halide to be reduced. In the reaction of aluminum with titanium tetrachloride aluminum trichloride and titanium trichloride are products of the reaction. The desired product is titanium trichloride but in order for the titanium trichloride to be useful in producing highly crystalline polymers it is essential that the aluminum trichloride be removed from the titanium trichloride. The problem of removing the aluminum trichloride is quite difficult and attempts to remove the aluminum trichloride by such procedures as extraction or sublimation have been only partially successful. It appears that the separation problem may be related to the fact that aluminum trichloride and titanium trichloride are isomorphous, and, consequently, they crystallize quite readily together in the same crystalline lattice. Thus, titanium trichloride prepared by an aluminum reduction reaction has been found to contain substantial amounts of aluminum trichloride and when the titanium trichloride is employed in olefin polymerization reactions the presence of the aluminum trichloride results in the formation of prohibitively large quantities of oily and amorphous polymers.

In order to obviate some of the problems encountered in the reduction of a transition metal halide with a reducing metal such as aluminum or other metal selected from Groups II and IIIa of the Periodic Table it has been proposed that the reduction reaction be carried out in the presence of a complexing agent that forms a complex with the halide of the reducing metal produced during the reduction reaction. This process has resulted in the production of a reduced transition metal halide that is quite effective for use in catalyst systems for the polymerization of propylene and other α-monoolefins. However, for polymerization reactions of this type it, of course, is desirable to use a reduced transition metal halide of optimum effectiveness for producing a polymer of maximum crystallinity at high rates of reaction. It is the purpose of our invention to provide a reduced transition metal halide that is more effective in polymerization reactions than any reduced transition metal halide known heretofore.

It is an object of this invention to provide a novel process for the production of reduced transition metal halides, such as titanium trichloride. It is another object of this invention to produce reduced transition metal halides having catalytic properties not attainable with prior art types of reduced transition metal halides. It is a further object of this invention to effect olefin polymerization reactions in the presence of catalysts containing our novel reduced transition metal halide to produce highly crystalline solid polymers and to substantially reduce the formation of oily and amorphous polymers in the polymerization reaction. Further and additional objects of this invention will be apparent from the detailed disclosure that follows.

In accordance with our invention, we have found that an improved form of a reduced transition metal halide can be obtained by reducing a halide of a transition metal selected from the group consisting of titanium, zirconium, vanadium, molybdenum and chromium with a mixture of a reducing metal selected from Groups II and IIIa of the Periodic Table and a co-reducing agent that is a compound of a metal in Groups Ia, II and IIIa of the Periodic Table in the presence of a complexing agent that forms a complex with the halide of said reducing metal produced in the process, the complex of the halide of said reducing metal being substantially soluble in said complexing agent. The resulting product containing the reduced transition metal halide can be employed as it is formed by the reduction reaction and the Group II or IIIa metal halide in the product does not deleteriously affect the polymerization reaction. On the other hand, the Group II or IIIa metal halide is readily separable from the transition metal halide in the reduction reaction product, and, as a result of our novel reduction reaction, it is possible to produce a reduced transition metal halide substantially free of free reducing metal halide.

The reducing metals that can be used in practicing our invention are selected from Groups II and IIIa of the Periodic Table. Among these reducing metals are beryllium, magnesium, zinc, calcium, strontium, barium, indium, thallium, aluminum and gallium. It is preferred to employ metallic aluminum in our reduction reaction, and if desired, the metallic aluminum can be employed in the form of a metal alloy with another metal, such as magnesium.

The co-reducing agents that are employed in the practice of our invention to assist in the production of a reduced transition metal halide are compounds of metals in Groups Ia, II and IIIa of the Periodic Table. These compounds can be the alkyl, phenyl or hydride derivatives of the metals in Groups Ia, II and IIIa or the complex hydride, alkyl or phenyl derivatives of aluminum and an alkali metal. Also, organoaluminum halides, having the formula $R_mAlX_n$ and $R_3Al_2X_3$ wherein R is a hydrocarbon radical selected from the group consisting of lower alkyl, cycoalkyl, phenyl and tolyl, and X is a halogen selected from the group consisting of chlorine and bromine, and $m$ and $n$ are integers whose sum is equivalent to the valence of aluminum, can be used as co-reducing agents. Similarly, organomagnesium compounds, having the formula RMgX wherein R and X are as defined above for the organoaluminum compounds, are useful in the practice of our invention. Typical co-reducing agents that can be used are the trialkyl and triphenyl aluminum compounds, trialkyl boron, lithium aluminum hydride and lithium aluminum tetraalkyl; dialkyl aluminum chloride, alkyl aluminum dichloride, alkyl aluminum sesquichloride, dialkyl aluminum hydride, sodium hydride, potassium hydride, lithium hydride, alkyl lithium, phenyl lithium, dialkyl zinc, alkyl magnesium chloride, sodium alkyl and the like. In the co-reducing agents set forth above the alkyl radicals can contain from 1 to 12 carbon atoms.

The amount of co-reducing agent that is used in the practice of our invention can be varied widely but the most useful range is from about 0.1 mole percent to 10 mole percent based on the stoichiometric number of moles of reducing metal that is employed. If desired, however, the amount of co-reducing agent can be as high as 25 mole percent and 50 mole percent can be used if desired. The co-reducing agents can be used to decrease the amount of reducing metal that is employed to reduce the transition metal halide, and in some instances, it may be useful to use the co-reducing agent in addition to the usual amount of reducing metal and thus to increase the total amount of reducing agent employed in the reaction. It is important, however, to carry out the reduction with the reducing metal and co-reducing agent in situ. This is accomplished as a practical matter by adding a slurry containing the reducing metal in powder form and the co-reducing agent to a solution of the transition metal halide that is to be reduced. The reverse addition of reactants can be used, but more reproducible results are obtained by adding the mixture of reducing agents to the transition metal halide.

In the transition metal halides that are employed in our process the transition metal is selected from the group consisting of titanium, zirconium, vanadium, molybdenum and chromium and the halogen atoms are selected from the group consisting of chlorine, bromine and iodine. Prior to reduction, the transition metal is at its maximum valence and during the reduction a lower valency form of the transition metal is produced. We prefer to employ titanium tetrachloride in our process, and, as a result of the reduction reaction, titanium trichloride is formed.

The complexing agent that is used in our process forms a complex with the reducing metal halide produced in the reduction reaction. Thus, when metallic aluminum is used to reduce titanium tetrachloride, aluminum trichloride is formed, and the complexing agent forms a complex with the aluminum trichloride. The resulting complex is soluble in the complexing agent, and in most instances the complex is also soluble in common organic solvents, such as toluene, xylene, benzene, and the like. As complexing agent or medium for carrying out the transition metal halide reduction reaction, we prefer to employ a diaryl ether. Among the diaryl ethers that can be used are diphenyl ether, ditolyl ether, dixylyl ether, phenyltolyl ether, di(biphenyl)ether, diphenylphenyl ether, di(ethylphenyl)ether, di(propylphenyl)ether, di(n-butylphenyl) ether and the like. We prefer to employ diphenyl ether in our process, and, if desired, the diphenyl ether can be used in admixture with biphenyl which is commonly known as Dowtherm.

Other complexing agents that can be used are amides, such as N,N-dimethyl formamide, acetamide, N,N-dimethyl acetamide, propionamide and the like. Ketones, such as benzophenone, acetophenone, butyrone and 3-pentanone are similarly useful in our process. Carboxylic esters, such as ethyl benzoate, ethyl malonate, butyl succinate, propyl adipate, ethyl sebacate, butyl naphthoate and the like are useful as complexing agents, and similarly phenols such as p-cresol, o-ethyl phenyl, m-propyl phenol and other similar alkyl phenols are useful in our process. Nitro-containing compounds and nitrile-containing compounds such as nitrobenzene, p-nitrotoluene, 2-nitro-p-cymene, benzonitrile, butyronitrile, capronitrile, 2-naphthol nitrile and the like can also be employed. The organic sulfur compounds, such as dimethyl sulfoxide, dimethyl sulfone, diethyl sulfate, N,N-dimethylbenzene sulfonamide, dimethyl sulfoximine, dibutyl sulfoxide, dioctyl sulfone, diphenyl sulfate, N,N-dipropyl benzene sulfonamide, diethyl sulfoxide, and the like, are also useful in our process. We have also found that organophosphorous compounds, such as hexaalkyl phosphoramides, trialkyl and triaryl phosphates and trialkyl and triaryl phosphites are useful as reaction media or complexing agents. For example, hexamethyl phosphoric triamide, triphenyl phosphate, tricresyl phosphate, tridecyl phosphite, triethyl phosphite, triphenyl phosphite, triethyl phosphate, hexabutyl phosphoric triamide, hexaoctyl phosphoric triamide and the like can be similarly employed. In the organophosphorous compounds, the alkyl radicals usually contain 1 to 8 carbon atoms.

The details of the reduction reaction will be described using aluminum as the reducing metal, titanium tetrachloride as the transition metal to be reduced and diphenyl ether as the complexing agent or reaction medium. However, it will be understood that any of the reducing metals, transition metal halides and complexing agents set forth above can be similarly employed in the practice of our invention. The titanium tetrachloride is reduced to titanium trichloride with aluminum metal and co-reducing agent in diphenyl ether at a temperature usually within the range of 135 to 250° C., preferably 150 to 200° C. In the reaction from 0.9 to 2 times the stoichiometric quantity of aluminum required to reduce the titanium tetrachloride to titanium trichloride in accordance with the equation:

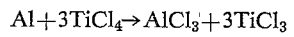
$$Al + 3TiCl_4 \rightarrow AlCl_3 + 3TiCl_3$$

is used. When the reduction reaction is conducted in the presence of diphenyl ether, aluminum trichloride formed during the reaction and diphenyl ether forms a complex in accordance with the following equation:

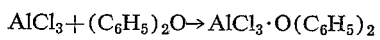
$$AlCl_3 + (C_6H_5)_2O \rightarrow AlCl_3 \cdot O(C_6H_5)_2$$

As a result of the formation of this complex co-crystallization of the aluminum trichloride and the titanium trichloride is prevented and the removal of aluminum trichloride from the reaction mixture is facilitated. The aluminum trichloride can be removed by filtering the hot reaction mixture, usually at the temperature used for the reduction reaction, since the aluminum trichloride-diphenyl ether complex is soluble in the diphenyl ether at reduction reaction temperatures. After filtration, the solid titanium trichloride can be washed with fresh hot diphenyl ether, and subsequently, with toluene or other organic solvent. The resulting titanium trichloride is a highly active catalyst component for olefin polymerization catalyst systems, and it contains less than a one percent by weight of aluminum trichloride. It is not essential that the aluminum trichloride-diphenyl ether complex be separated from the titanium trichloride in order that the titanium trichloride will be effective as a catalyst component. Thus, the hot reduction reaction mixture can be cooled prior to filtering and in that event the titanium trichloride is admixed with aluminum trichloride-diphenyl ether complex. The titanium trichloride actually contains substantially no free or uncomplexed aluminum trichloride and the titanium trichloride prepared in this manner can be used effectively as a catalyst component in olefin polymerization reactions.

We do not know the reason for the improved catalytic activity of a reduced transition metal halide, for example titanium trichloride prepared by practicing our invention. X-ray diffraction and infrared studies of titanium trichloride or other reduced transition metal halide produced according to our invention do not show any characterizing difference when compared with a similar reducing transition metal halide produced by using a reducing metal without any of our co-reducing agents. The most important characterizing difference of our reduced transition metal halides appears to be their unexpected superior activity when used as a component in catalyst systems that are used to polymerize olefinic hydrocarbons to solid, crystalline polymer.

If desired, in the titanium tetrachloride reduction reaction from 1 to about 30 mole percent of the titanium tetrachloride can be replaced by another transition metal halide, such as vanadium tetrachloride, zirconium tetrachloride, molybdenum pentachloride, chromic chloride and the like. The resulting mixture of transition metal halides can be reduced with aluminum and co-reducing agent in the manner described above and the resulting mixture of reduced transition metal chlorides can be similarly employed in olefin polymerization reactions. The titanium trichloride in our process has been found to contain no titanium dichloride. Thus, in the reduction reaction, the titanium tetrachloride is converted or reduced to the titanium trichloride without the formation of any titanium dichloride.

The reduced transition metal halide, such as titanium trichloride that is produced in our process can be employed in olefin polymerization catalyst systems which have been employed heretofore for the preparation of solid, high molecular weight, crystalline polymers. Thus, the reduced transition metal halide can be employed with at least one catalyst component selected from the following: (a) a metal from Groups Ia, II and IIIa of the Periodic Table, alkyl and hydride derivatives of the metals in Groups Ia, II and IIIa of the Periodic Table and complex metal hydrides of aluminum and alkali metal; (b) organoaluminum halides having the formula $R_mAlX_n$ and $R_3Al_2X_3$ wherein R is a hydrocarbon radical selected from the group consisting of lower alkyl, cycloalkyl, phenyl and tolyl, X is a halogen selected from the group consisting of chlorine and bromine and $m$ and $n$ are integers whose sum is equivalent to the valence of aluminum and (c) a polymeric reaction product of aluminum and a methylene halide. The polymerization reaction can be carried out in liquid phase in an inert organic liquid and preferably an inert liquid hydrocarbon vehicle, but excellent results can be obtained without using a solvent. The reaction proceeds with excellent results over a temperature range of from 0° C. to 250° C. but temperatures outside this range can be used if desired. Likewise, the reaction pressures may be varied widely from about atmospheric pressure to very high pressures of the order of 20,000 p.s.i. or higher. The liquid vehicle employed is desirably one which serves as an inert liquid reaction medium.

The polymerization reaction is employed in the preparation of highly crystalline polypropylene, the polybutenes and polystyrene although it can be used for polymerizing mixtures of ethylene and propylene as well as other α-monoolefins containing up to 10 carbon atoms. The polypropylene produced in accordance with this invention is a highly crystalline polymer that can be used in molding operations to form products of excellent clarity. The high molecular weight, high density polymers of this invention are insoluble in solvents at ordinary temperatures, but they are soluble in such solvents as xylene, toluene or tetralin at elevated temperatures. These solubility characteristics make it possible to carry out the polymerization process under conditions wherein the polymer formed is soluble in the reaction medium during the polymerization and can be precipitated therefrom by lowering the temperature of the resulting mixture.

The polypropylene, polystyrene, polybutenes and other polyolefins prepared in accordance with the invention can be molded or extruded and can be used to form plates, sheets, films, or a variety of molded objects which exhibit a higher degree of stiffness than do the corresponding high pressure polyolefins. The products can be extruded in the form of pipe or tubing of excellent rigidity and can be injection molded into a great variety of articles. The polymers can also be cold drawn into ribbons, bands, fibers or filaments of high elasticity and rigidity. Fibers of high strength can be spun from the molten polymers obtained according to this process.

The polymerization reaction can be carried out batchwise or in a continuous flowing stream process. The continuous processes are preferred for economic reasons, and particularly good results are obtained using continuous processes wherein a polymerization mixture of constant compositon is continuously and progressively introduced into the polymerization zone and the mixture resulting from the polymerization is continuously and progressively withdrawn from the polymerization zone at an equivalent rate, whereby the relative concentration of the various components in the polymerization zone remains substantially unchanged during the process. This results in formation of polymers of extremely uniform molecular weight distribution over a relatively narrow range. Such uniform polymers possess distinct advantages since they do not contain any substantial amount of the low molecular weight or high molecular weight formations which are ordinarily found in polymers prepared by batch reactions.

In the continuous flowing stream process, the temperature is desirably maintained at a substantially constant value within the preferred range in order to achieve the highest degree of uniformity. Since it is desirable to employ a solution of the monomer of relatively high concentration, the process is desirably effected under a pressure of from 30 to 1000 p.s.i. obtained by pressuring the system with the monomer being polymerized. The amount of vehicle employed can be varied over rather wide limits with relation to the monomer and catalyst mixture. Best results are obtained using a concentration of catalyst of from about 0.1% to about 2% by weight based on the weight of the vehicle. The concentration of monomer in the vehicle will vary rather widely depending upon the reaction conditions and will usually range from about 2 to 50% by weight. For a solution process it is preferred to use a concentration from about 2 to about 10% by weight based on the weight of the vehicle and for a slurry type of process higher concentrations, for example, up to 40% and higher are preferred. Higher concentrations of monomer ordinarily increase the rate of polymerization but concentrations of 5 to 10% by weight in a solution process are ordinarily less desirable because the polymer dissolved in the reaction medium results in a very viscous solution.

The organic vehicle employed in the polymerization reaction can be an aliphatic alkane or cycloalkane such as pentane, hexane, heptane or cyclohexane, or a hydrogenated aromatic compound such as tetrahydronaphthalene or decahydronaphthalene, or a high molecular weight liquid paraffin or mixture of paraffins which are liquid at the reaction temperature, or an aromatic hydrocarbon such as benzene, toluene, xylene, or the like, or a halogenated aromatic compound such as chlorobenzene, chloronaphthalene, or orthodichlorobenzene. The nature of the vehicle is subject to considerable variation, although the vehicle employed should be liquid under the conditions of reaction and relatively inert. The hydrocarbon liquids are desirably employed. Other solvents which can be used include ethyl benzene, isopropyl benzene, ethyl toluene, n-propyl benzene, diethyl benzenes, mono and dialkyl naphthalenes, n-octane, isooctane, methyl cyclohexane, tetralin, decalin, and any of the other well known inert liquid hydrocarbons.

The polymerization ordinarily is accomplished by merely admixing the components of the polymerization mixture, and no additional heat is necessary unless it is desired to effect the polymerization at an elevated temperature in order to increase the solubility of polymeric product in the vehicle. When the highly uniform polymers are desired employing the continuous process wherein the relative proportions of the various components are maintained substantially constant, the temperature is desirably controlled within a relatively narrow range. This is readily accomplished since the solvent vehicle forms a high percentage of the polymerization mixture and hence can be heated or cooled to maintain the temperature as desired.

The polymerization reaction has been described above as being effective primarily for the polymerization of α-monoolefins. This process can also be used for polymerizing other α-monoolefins, and it is not necessary to limit the process of the invention to monoolefins. Other α-olefins that can be used are butadiene, isoprene, 1,3-pentadiene and the like.

The following examples are illustrative of the results obtainable by practicing our invention. In these examples, the polymerization rate and percent extractables were determined as follows:

DETERMINATION OF POLYMERIZATION RATE

A 10-gram quantity of a complex consisting of ethyl aluminum dichloride and hexamethylphosphoric triamide in the molar ratio of 1:0.6 was prepared. A clean, dry stainless steel autoclave was charged with 0.2 gram of this complex (in the drybox) and 0.3 gram of the $TiCl_3$ to be tested. The autoclave was sealed and charged with 200 ml. of liquid propylene from a blowcase. The autoclave was placed on a rocker and the temperature was raised to 85° C. and held for a definite time interval while rocking. The polymer was isolated by washing with methanol. The polymer was dried overnight at 50° C. and weighed.

The rate of polymerization in terms of grams of polymer per gram of catalyst per hour was determined by running for 30 minutes, 1 hour, 2 hours. The rate is thus determined in grams of polypropylene formed per hour per gram of total catalyst used.

DETERMINATION OF PERCENT EXTRACTABLES

Thirty grams of polypropylene was extracted in a Soxhlet extractor at 110° C. for 8 hours with n-butyl ether. The butyl ether removes the non-crystalline polypropylene. The ether was evaporated and the extracted polymer was washed with ethanol, then with water, and dried overnight in an oven at 50° C. The dried extract was then weighed and the percent extractables calculated.

*Example 1.—Reduction of $TiCl_4$ with aluminum and a co-reducing agent*

One hundred twenty-five cc. of a eutectic mixture of diphenyl ether and biphenyl (distilled and dried over sodium) and 33 cc. (0.3 mole) $TiCl_4$ were mixed in a 500-cc. flask equipped with a high speed stirrer, water-cooled condenser and a dropping funnel with a side arm for blanketing both funnel and reaction flask with dry nitrogen. 0.1 gram of anhydrous aluminum chloride was then added and the mixture was heated to 170° C. To this hot, stirred mixture was added dropwise a suspension of aluminum powder (3.8 grams, 0.113 mole, assay 80% aluminum metal) and 1.2 cc. of a 10% solution of triethyl aluminum in hexane (0.001 mole or 1% of the stoichiometric molar quantity of aluminum required to reduce 0.3 mole of $TiCl_4$) over a 30-minute period. The reaction temperature was maintained at 170° C. for 2 hours after the addition was complete. An additional 15 cc. of dry diphenyl ether-biphenyl was used to wash remaining aluminum slurry from the dropping funnel into the reaction vessel. The reaction mixture was then cooled to 150° C. and filtered hot under nitrogen. The solid $TiCl_3$ product was then slurried with approximately 35 cc. of dry benzene or toluene and filtered. The slurrying and filtering operation was carried out three times. The product was then given a final wash with dry petroleum ether (25 to 50 cc.). The final traces of this solvent were removed by placing the solid $TiCl_3$ under 1–2 mm. pressure while heating on a steam bath. The yield was 45 grams (97%). The polymerization rate was found to be 160 grams of polypropylene per gram of total catalyst per hour; extractables were 4% (see Table I).

(A) In a similar reaction only 0.1 mole percent triethyl aluminum was used as the co-reducing agent with the aluminum metal. A $TiCl_3$ product was obtained which had an activity of 130 grams of polymer per gram of catalyst per hour with an extractable content of 3%.

(B) In a similar reaction magnesium was used as the reducing metal in place of aluminum. The reduction was carried out at 200° instead of 170° and the co-reducing agent used with the magnesium was tributyl boron (0.001 mole). The $TiCl_3$ product was obtained which had an activity of 125 grams of polymer per gram of catalyst per hour.

(C) In a similar reduction to that of Example 1B, zinc was used as the reducing metal. The reactant quantities and temperatures were the same as Example 1B. The co-reducing agent was lithium aluminum tetrabutyl. The highly active $TiCl_3$ product had an activity of 127 grams of polymer per gram of catalyst per hour.

*Example 2.—Reduction of $TiCl_4$ with aluminum only*

The procedure of Example 1 was followed exactly except no co-reducing agent was used. The amount of aluminum used was the same as Example 1 (3.8 grams, 0.113 mole). The quantity of $TiCl_4$ was also the same as used in Example 1 (33 cc. or 0.3 mole). The yield of solid dry $TiCl_3$ was 45 grams. The activity rate when measured according to procedure given above was found to be 85 grams polymer per gram of catalyst. The extractable content was 3% (see Table I).

*Example 3*

The procedure and the amount of reactants used was the same as in Example 1 except that 5 mole percent of aluminum triethyl (0.0056 mole) was used as the co-reducing agent with the aluminum metal. The amount of $TiCl_3$ produced was 45 grams, and it had a polymerization activity rate of 150 grams of polymer per gram of catalyst per hour. The extractable content was 5%.

(A) In a similar manner it was determined that if the co-reducing agent was triphenyl aluminum instead of triethyl aluminum, the $TiCl_3$ produced had an activity rate of 140 grams of polymer per gram catalyst per hour.

(B) In a similar manner it was determined that trihexyl aluminum and tridecyl aluminum when used in 5 mole percent concentration with aluminum metal to reduce $TiCl_4$ in the process described in Example 1 gave a $TiCl_3$ that had a polymerization rate of 135 and 130 grams of polymer per gram of catalyst per hour, respectively.

*Example 4*

The procedure of Example 1 was followed exactly except that the amount of aluminum metal powder was 5.4 grams (0.15 mole, 80% aluminum metal assay) and the amount of co-reducing agent, triethyl aluminum, was 0.015 mole or 10 mole percent based on the aluminum used. The amount of $TiCl_4$ used was the same (0.3 mole) as used in Example 1. The product $TiCl_3$ was found to have a polymerization rate of 162 grams of polymer per gram of catalyst per hour, and the extractable content was 4%.

(A) In a similar manner it was determined that when either diethylaluminum chloride or dihexylaluminum chloride was used in place of the triethyl aluminum in this example, a $TiCl_3$ was produced that had a polymerization activity rate of 138 and 129 grams of polymer per gram of catalyst per hour, respectively.

(B) When ethylaluminum dichloride was used as the co-reducing agent with aluminum metal, the $TiCl_3$ produced had an activity rate of 130 grams of polymer per gram of catalyst per hour.

(C) When triethylaluminum sesquibromide was used as the co-reducing agent with aluminum metal, the $TiCl_3$ produced had an activity rate of 128 grams of polymer per gram of catalyst per hour.

*Example 5*

The procedure of Example 1 was followed exactly except that the amount of aluminum metal was 3.3 grams (0.099 mole, 80% aluminum metal assay) and the amount of co-reducing agent was 0.001 mole or one mole percent based on the stoichiometric amount of aluminum required to reduce 0.3 mole $TiCl_4$. The amount of $TiCl_4$ used was 0.3 mole as in Example 1. The co-reducing agents used with this procedure were: (a) diethylaluminum hydride which gave a $TiCl_3$ product with a polymerization activity rate of 132 grams of polymer per gram of catalyst per hour; (b) lithium aluminum hydride which gave a $TiCl_3$ product with a polymerization activity of 137 grams of polymer per gram of catalyst per hour and an extractable content of 3%; (c) sodium hydride which gave a $TiCl_3$ product with a polymerization activity of 135 grams of polymer per gram of catalyst per hour; (d) magnesium hydride which gave a $TiCl_3$ product with a polymerization activity of 122 grams of polymer per gram of catalyst.

*Example 6*

The procedure of Example 1 was followed. The amount of aluminum metal used was 3.8 grams, (0.113 mole, aluminum metal assay 80%). The amount of organometallic co-reducing agent used with the aluminum was 0.001 mole. The amount of $TiCl_4$ used was 0.3 mole as in Example 1. The co-reducing agents were organometallic compounds of metals from Groups I and II of the Periodic Table.

(A) *Butyl lithium*.—The resulting $TiCl_3$ product was found to have a polymerization rate of 150 grams of polymer per gram of catalyst per hour. The percent extractables was 4%.

(B) *Phenyl lithium*.—The resulting $TiCl_3$ product was found to have a polymerization rate of 130 grams of polymer per gram of catalyst per hour.

(C) *Diethyl zinc*.—The resulting $TiCl_3$ product was found to have a polymerization rate of 152 grams of polymer per gram of catalyst per hour. The percent extractables was 5%.

(D) *Diethyl magnesium bromide*.—The resulting $TiCl_3$ product was found have a polymerization rate of 129 grams of polymer per gram of catalyst per hour. The percent extractables was 5%.

(E) *Sodium amyl*.—The resulting $TiCl_3$ product was found to have a polymerization rate of 120 grams of polymer per gram of catalyst per hour.

*Example 7.—Reduction of $TiCl_4$ with an organometallic reducing agent only*

The procedure for this reduction using an organometallic reducing agent, triethyl aluminum with no aluminum present was similar to that described in Example 1. The amount of triethyl aluminum used was 34.2 grams (0.3 mole) and the reduction temperature was held at 75° C. The triethyl aluminum in diphenyl ether-biphenyl was added to the $TiCl_4$ in diphenyl ether-biphenyl in the same time interval of 30 minutes as described in Example 1. The solid product was isolated, washed and dried in the same manner as described in Example 1. The yield was essentially theoretical. The polymerization rate was 80 grams of polymer per gram of catalyst per hour. The extractable content was over 50%.

*Example 8*

A commercial sample of $TiCl_3$ prepared by the hydrogen reduction of $TiCl_4$ was found to have a polymerization rate of 16 grams of polymer per gram of catalyst when used according to our described procedure for determining polymerization rate. The percent extractables was 2.

PREPARATION OF MECHANICAL MIXTURES OF ALUMINUM-REDUCED AND ORGANOMETALLIC-REDUCED $TiCl_3$

These runs were carried out to show that the activating effect of our new, highly active $TiCl_3$ composition was not due to a simple mechanical mixture of the reaction product of an organometallic-reduced $TiCl_4$ with our aluminum-reduced $TiCl_4$. It also shows that the activating effect is not due to simple contamination of the $TiCl_3$ with the organometallic reducing agent. If this were true, the mechanical mixtures of aluminum-reduced and organometallic-reduced materials would have shown the same activation. No activation was observed (see Table III).

*Example 9*

Mechanical mixtures of the $TiCl_3$ prepared by reduction with aluminum only (Example 2) were made with the $TiCl_3$ prepared by reduction with an organometallic compound only (Example 7). These mixtures were prepared by two procedures. In both procedures the two $TiCl_3$ components to be mixed were carefully weighed in a dry box and then mechanically mixed. The method of mixing in one case involved sealing the two weighed components in a bottle in the dry box and tumbling the dry powder overnight. Another mixing procedure involved suspending the two $TiCl_3$ components in a dry inert solvent such as hexane or petroleum ether and then filtering and drying. There was no essential difference in the activity of the mixtures by these two methods.

A mechanical mixture of the product from Example 2 (reaction product of $TiCl_4$ with aluminum in diphenyl ether-biphenyl) and the product of Example 7 (reduction product of $TiCl_4$ with triethyl aluminum) was made. The polymerization rate of this mixture was then determined according to our described procedure for determining polymerization rate. The mixtures made and the polymerization rate obtained are given below and in Table III.

(A) A mixture containing 99% $TiCl_3$ from Example 2 and 1% $TiCl_3$ from Example 7 was prepared to correspond to the ratio of the two reducing agents in Example 1. The mixture had a polymerization rate of 70 grams of polymer per gram of catalyst per hour when used in our procedure for determining polymerization rate. The extractable content was 10%.

(B) A mixture containing 95% $TiCl_3$ from Example 2 and 5% $TiCl_3$ from Example 7 was prepared to correspond to the ratio of reducing agents used in Example 3. The mixture had a polymerization rate of 52.4 grams of polymer per gram of catalyst per hour when used in our procedure for determining polymerization rate. The extractable content was 13%.

(C) A mixture containing 90% $TiCl_3$ from Example 2 and 10% $TiCl_3$ from Example 7 was prepared to correspond to the ratio of reducing agents used in Example 4. The mixture had a polymerization rate of 83 grams of polymer per gram of catalyst per hour when used in our procedure for determining polymerization rate. The extractable content was 14%.

TABLE I.—ACTIVITY OF TiCl₃ WITH MIXED REDUCING AGENTS

| TiCl₃ From Example | Co-Reducing Agent | Mole Percent of Co-Reducing Agent | Polymerization Rate, g. Polymer/g. catalyst/Hour | Percent Extractables |
|---|---|---|---|---|
| 1 | Triethyl aluminum | 1 | 160 | 4 |
| 1A | ....do.... | 0.1 | 130 | 3 |
| 1B | Tributyl boron | 0.1 | 125 | |
| 1C | Lithium aluminum tetrabutyl | 0.1 | 127 | |
| 2 | None | 0 | 85 | 3 |
| 3 | Triethyl aluminum | 5 | 150 | 5 |
| 3A | Triphenyl aluminum | 5 | 140 | |
| 3B | Trihexyl aluminum | 5 | 135 | |
| | Tridecyl aluminum | 5 | 130 | |
| 4 | Triethyl aluminum | 10 | 162 | 4 |
| 4A | Diethylaluminum chloride | 10 | 138 | |
| | Dihexylaluminum monochloride | 10 | 129 | |
| 4B | Ethylaluminum dichloride | 10 | 130 | |
| 4C | Triethylaluminum sesquibromide | 10 | 128 | |
| 5A | Diethylaluminum hydride | 1 | 132 | 3 |
| 5B | Lithiumaluminum hydride | 1 | 137 | 3 |
| 5C | Sodium hydride | 1 | 135 | |
| 6A | Butyl lithium | 1 | 150 | 4 |
| 6B | Phenyl lithium | 1 | 130 | |
| 6C | Diethyl zinc | 1 | 152 | 5 |
| 6D | Ethylmagnesium chloride | 1 | 129 | 5 |
| 6E | Sodium amyl | 1 | 120 | |

TABLE II.—ACTIVITY OF TiCl₃ BY OTHER REDUCTION METHODS

| TiCl₃ From Example | Single Component Reducing Agent | Polymerization Rate, g. Polymer/g. catalyst/hr. | Percent Extractables |
|---|---|---|---|
| 2 | Aluminum in diphenyl ether-biphenyl. | 85 | 3 |
| 7 | Triethyl aluminum | 80 | 50 |
| 8 | Hydrogen | 16 | 2 |

TABLE III.—ACTIVITY OF MECHANICAL MIXTURES OF TiCl₃ FROM EXAMPLES 2 AND 7

| Mixture from Example | Percent TiCl₃ by Aluminum Reduction in Diphenyl ether-biphenyl Example 2 | Percent TiCl₃ by triethyl aluminum in diphenyl ether-biphenyl Example 7 | Activity of Mixture, g. polymer/g. catalyst/hr. | Percent Extractables |
|---|---|---|---|---|
| 9A | 99 | 1 | 70 | 10 |
| 9B | 95 | 5 | 52.4 | 13 |
| 9C | 90 | 10 | 83 | 14 |

*Example 10*

In the foregoing examples diphenyl ether-biphenyl can be replaced by hexamethylphosphoric triamide, N,N-dimethylformamide, triethyl phosphate, triethyl phosphite, benzophenone, ethyl benzoate, p-cresol, nitrobenzene, benzonitrile, and diphenyl sulfone as complexing agents for the preparation of TiCl₃.

The use of reduced transition metal halides produced in accordance with our invention in olefin polymerization catalysts results in a highly unexpected increase in the rate of polymerization when compared with prior art types of reduced transition metal halides. Also, the use of our reduced transition metal halides in olefin polymerization reactions results in the production of a polymer having an unexpectedly increased crystallinity and an unexpectedly decreased amorphous polymer content. From the results obtained with prior art and commercial types of reduced transition metal halides, the results we have realized could not have been foreseen.

Although the invention has been described in detail with reference to certain preferred embodiments thereof, variations and modifications can be effected within the spirit and scope of the invention as described hereinabove and as defined in the appended claims.

We claim:
1. The method for producing a reduced transition metal halide which comprises reacting a halide of a transition metal selected from the group consisting of titanium, vanadium, zirconium, chromium and molybdenum, at its maximum valence with a reducing metal from Groups II and IIIa of the Periodic Table and a co-reducing compound of a metal in Groups Ia, II and IIIa of the Periodic Table to form a halide of said reducing metal in the presence of a complexing agent that forms a complex with said halide of said reducing metal from Groups II and IIIa of the Periodic Table, said complex being substantially soluble in said complexing agent and said reduced transition metal halide being substantially insoluble in said complexing agent, the valence of transition metal in said reduced transition metal halide being one less than the maximum valence of said transition metal.

2. The method according to claim 1 wherein a titanium tetrahalide is reduced to form a titanium trihalide.

3. The method according to claim 2 wherein aluminum is the reducing metal and a trialkyl aluminum is the co-reducing compound.

4. The method according to claim 3 wherein diphenyl ether is the complexing agent.

5. The method according to claim 4 wherein triethyl aluminum is the co-reducing compound and from 0.1 to 10 mole percent of triethyl aluminum based on the aluminum metal is used.

6. The method acccording to claim 5 wherein a reaction temperature within the range of 135 to 250° C. is used.

7. The method according to claim 6 wherein vanadium tetrachloride is used in place of titanium tetrachloride, diethyl aluminum chloride is used in place of triethyl aluminum and hexamethyl phosphoric triamide is used in place of diphenyl ether.

8. In a catalytic process for the polymerization of an α-olefinic hydrocarbon to form solid crystalline polymer wherein a reduced transition metal halide is employed as a component of a catalyst that contains another component selected from the group consisting of (a) a metal from Groups Ia, II and IIIa of the Periodic Table, alkyl and hydride derivatives of the metals in Groups Ia, II and IIIa of the Periodic Table and complex metal hydrides of aluminum and alkali metal; (b) organoaluminum halides having the formula $R_mAlX_n$ and $R_3Al_2X_3$ wherein R is a hydrocarbon radical selected from the group consisting of lower alkyl, cycloalkyl, phenyl and tolyl, X is a halogen selected from the group consisting of chlorine and bromine and $m$ and $n$ are integers whose sum is equivalent to the valence of aluminum and (c) a polymeric reaction product of aluminum and a methylene halide, the improvement which comprises employing a catalyst containing a reduced transition metal halide prepared by reacting a halide of a transition metal selected from the group consisting of titanium, vanadium, zirconium, chromium and molybdenum, at its maximum valence with a reducing metal from Groups II and IIIa of the Periodic Table and a co-reducing compound of a metal in Groups Ia, II and IIIa of the Periodic Table to form a halide of said reducing metal in the presence of a complexing agent that forms a complex with said halide of said reducing metal from Groups II and IIIa of the Periodic Table, said complex being substantially soluble in said complexing agent and said reduced transition metal halide being substantially insoluble in said complexing agent, the valence of transition metal in said reduced transition metal halide being one less than the maximum valence of said transition metal.

9. In a catalytic process for the polymerization of propylene to form solid crystalline polymer wherein titanium trichloride is employed as a component of said catalyst with an organoaluminum halide, the improvement which comprises employing a catalyst containing titanium trichloride prepared by reacting titanium tetrachloride with aluminum and triethyl aluminum at a temperature within the range of 150 to 250° C. in the presence of diphenyl ether, said aluminum and titanium tetrachloride being reacted to form aluminum trichloride which forms a complex with said diphenyl ether.

10. The process according to claim 9 wherein hexamethyl phosphoric triamide is used in place of diphenyl ether.

11. As a composition of matter an olefin polymerization catalyst comprising a reduced transition metal halide prepared according to the process of claim 1 and a catalyst component selected from the group consisting of (a) a metal from Groups Ia, II and IIIa of the Periodic Table, alkyl and hydride derivatives of the metals in Groups Ia, II and IIIa of the Periodic Table and complex metal hydrides of aluminum and alkali metal; (b) organoaluminum halides having the formula $R_mAlX_n$ and $R_3Al_2X_3$ wherein R is a hydrocarbon radical selected from the group consisting of lower alkyl, cycloalkyl, phenyl and tolyl, X is a halogen selected from the group consisting of chlorine and bromine and $m$ and $n$ are integers whose sum is equivalent to the valence of aluminum and (c) a polymeric reaction product of aluminum and a methylene halide.

12. As a composition of matter a catalyst according to claim 11 wherein the reduced transition metal halide is titanium trichloride.

References Cited

UNITED STATES PATENTS

| | | | |
|---|---|---|---|
| 3,001,951 | 9/1961 | Tornqvist et al. | 252—429 |
| 3,108,973 | 10/1963 | Vandenberg | 260—94.0 |
| 3,146,224 | 8/1964 | Coover et al. | 260—93.7 |
| 3,151,946 | 10/1964 | Nagamo | 23—87 |
| 3,164,577 | 1/1965 | Liebman | 260—93.7 |
| 3,256,259 | 6/1955 | Seger etal. | 260—93.7 |

JOSEPH L. SCHOFER, *Primary Examiner.*

M. B. KURTZMAN, *Assistant Examiner.*